(12) United States Patent
Yang

(10) Patent No.: US 6,338,259 B1
(45) Date of Patent: *Jan. 15, 2002

(54) COOLING APPARATUS USED IN FABRICATION OF OPTICAL FIBER PREFORM

(75) Inventor: Jin-Seong Yang, Daegukwangyeok (KR)

(73) Assignee: SamSung Electronics Co., Ltd., Suwon (KR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/929,471

(22) Filed: Sep. 15, 1997

(30) Foreign Application Priority Data

Sep. 13, 1996 (KR) .............................. 96-39868

(51) Int. Cl.⁷ ................................................ C03D 37/01
(52) U.S. Cl. ............................ 65/513; 65/417; 65/510; 65/514; 65/529; 65/530; 65/531
(58) Field of Search .................... 65/417, 510, 514, 65/529, 530, 531, 513

(56) References Cited

U.S. PATENT DOCUMENTS

| | | | |
|---|---|---|---|
| 3,097,941 A | 7/1963 | Toulmin, Jr. ................ | 65/446 |
| 3,260,586 A | 7/1966 | Prohaszka et al. ............. | 65/86 |
| 3,561,096 A | 2/1971 | Krengel et al. ............... | 29/460 |
| 4,101,300 A | 7/1978 | Imoto et al. .................. | 65/382 |
| 4,123,242 A | 10/1978 | Imoto et al. .................. | 65/491 |
| 4,576,622 A | 3/1986 | Jung ............................ | 65/531 |
| 4,578,098 A | * 3/1986 | Paek et al. .................... | 65/510 |
| 4,594,088 A | 6/1986 | Pack et al. .................... | 65/432 |
| 4,632,574 A | 12/1986 | Wilson et al. ................. | 384/12 |
| 4,894,078 A | 1/1990 | Takimoto et al. ............. | 65/432 |
| 5,366,530 A | 11/1994 | Weber ......................... | 65/403 |

FOREIGN PATENT DOCUMENTS

| | | |
|---|---|---|
| DE | 40 39 578 | 6/1992 |
| EP | 0 18 230 | 7/1986 |
| EP | 0 357 341 A2 | 3/1990 |

* cited by examiner

Primary Examiner—James Derrington
(74) Attorney, Agent, or Firm—Robert E. Bushnell, Esq.

(57) ABSTRACT

An apparatus and process for cooling a quartz tube used in fabrication of an optical fiber preform by modified chemical vapor deposition. The apparatus has a nozzle ring supplied with a coolant. The nozzle ring has at least two vent sections that are be separatable for detaching the quartz tube from a lathe during processing, and a plurality of vents formed along the inside of the two vent sections for ejecting the coolant.

20 Claims, 3 Drawing Sheets

COOLING APPARATUS USED IN FABRICATION OF OPTICAL FIBER PREFORM

CLAIM FOR PRIORITY

This application makes reference to, claims all rights of priority accruing under 35 U.S.C. §119, and incorporates the same herein, from my patent application entitled Cooling Apparatus Used In Fabrication Of Optical Fiber Preform earlier filed in the Korean Industrial Property Office on Sep. 13, 1996, and there duly assigned Serial No. 39868/1996 by that Office.

BACKGROUND OF THE INVENTION

1. Field of the Invention

The present invention concerns an apparatus and a process for fabricating an optical fiber preform by modified chemical vapor deposition (MCVD), and more particularly an apparatus and a process for uniformly cooling a quartz tube used in fabrication of an optical fiber used generally or as a light amplifier to directly amplify an optical signal.

2. Description of the Related Art

Since the intensity of an optical signal is usually reduced when transmitted through a long distance or divided into several branches, it is required to amplify the optical signal by using a semiconductor or light amplifier. The light amplifier is widely and essentially used in an ultra high speed communication network, generally employing erbium (Er) added optical fiber as a medium for internally amplifying the optical signal. The erbium added optical fiber is fabricated by using modified chemical vapor deposition (MCVD).

Contemporary practice in the art typically relies upon the flow of a raw gas through a quartz tube while the quartz tube is rotated and heated. The raw gas experiences a chemical reaction and deposits particles on the inside of the quartz tube. The burner is moved in the direction of gas flow in order to precipitate the deposition of the particles along the inside the quartz tube. Meanwhile, the deposited particles are sintered by the heat of the moving burner to form a glass phase.

In order to obtain an optical fiber preform for a light amplifier a process such as liquid penetration, gaseous state addition or sol-gel is used with a liquid penetration process forming a porous layer over the core layer. A cooling apparatus is used behind the burner to form the porous layer after formation of the clad layer.

In glass tubing fabrication, efforts such as P. J. H. Prohaskzka, et al., U.S. Pat. No. 3,260,586 teach water cooling via streams applied at acute angles opposite to and against the direction of travel of hot glass tubing. I believe that this is not suitable for optical fiber fabrication however. U.S. Pat. No. 4,576,622 to Lothar Jung for the Manufacture OfPreforms for energy Transmitting Fibers, for example, a travelling cooling apparatus is used to provide downstream cooling during the modified chemical vapor deposition process while in the Method And Apparatus For Fabricating An Oval Cross-Sectional Optical Waveguide, of Dieter Weber, U.S. Pat. No. 5,366,530 for example, nozzles direct cooling gases from two diametrically opposite sides of the tube. Generally, I have found that contemporary cooling processes cause non-uniform cooling of the inside of the quartz tube because of the coolant is ejected in a single direction towards the quartz tube, so that the finally obtained optical fiber has a distribution of non-uniform refractive index, increasing the reflective loss of the optical fiber.

Other contemporary cooling techniques sometimes used to manufacture a porous layer use an annular tube for supplying coolant through a plurality of nozzles radially mounted along the inner perimeter of the annular tube to eject the coolant towards the quartz tube. These contemporary fabrication designs such as the gas curtain devices used in the Method And Apparatus For Drawing Optical Fiber of K. Imoto, et al, U.S. Pat. No. 4,101,300; the Apparatus For Producing Optical Fiber of K. Imoto et al., U.S. Pat. No. 4,123,242, and the plenum for the Method And Apparatus For Making, Coating and Cooling Lightguide Fiber of Un-chul Paek, U.S. Pat. No. 4,594,088, as well as the later efforts shown in the Method And Apparatus For Producing Optical Fiber of H. Takimoto and K. Sakamoto, U.S. Pat. No. 4,894,078 using a continuous helical spiral to provide cooling, seem to be particularly cumbersome due to the difficulty encountered by the need for the cooling stage of the fabrication apparatus to surround a length of the fiber. I have found these designs to be troublesome because it is very difficult to mount the nozzles radially on the inner perimeter of the nozzle support annular tube. Additionally, it is impossible to attach or detach a quartz tube to or from a lathe during processing because the nozzle support annular tube is made of a single continuous ring.

SUMMARY OF THE INVENTION

It is an object of the present invention to provide an improved optical fiber, process and apparatus for manufacturing optical fiber.

It is another object to provide a cooling apparatus for uniformly ejecting a coolant towards the outside of a quartz tube so as to form a uniform porous layer in the quartz tube.

It is still another object to provide a process and apparatus for manufacturing optical fiber for a light amplifier having an uniform refractive index.

It is yet another object to provide a cooling apparatus having a simple structure that enhances productivity.

It is still yet another object to provide a cooling apparatus for allowing for quick and easy attachment and detachment of a quartz tube during processing.

It is a further object of the present invention to provide a cooling apparatus uniformity ejecting a coolant towards a part of a quartz tube.

It is a still further object to provide a cooling apparatus for improving the deposition efficiency of the porous layer when fabricating a optical fiber preform by using modified chemical vapor deposition.

According to one aspect of the present invention, an apparatus for cooling a quartz tube used in fabrication of an optical fiber preform by modified chemical vapor deposition may be constructed with a circular plenum supplied with a coolant, and constructed with at least two pivotably separatable, semicircular vent sections readily accommodating detachment and removal of the quartz tube from the chuck of a lathe during processing. The plenum is perforated by a plurality of nozzles formed by orifices arcuately spaced apart along the inside of the vent sections for uniformly ejecting the coolant simultaneously around the entire exterior circumference of the quartz tube passing through the plenum.

According to another aspect of the present invention, an apparatus for cooling a quartz tube used in fabrication of an optical fiber preform by modified chemical vapor deposition may be constructed with a nozzle supplied with a coolant, and constructed with a first and a second vent hollow semicircular sections for accommodating detachment of the quartz tube from the chuck of a lathe. A plurality of vents orifices are formed in arcuate separation along the inside circumferential surface of the semicircular sections for radially ejecting the coolant. A coolant collector receives the coolant ejected out of the vents, while a bracket connected between the nozzle and the coolant collector supports the nozzle. A first connecting arm pivotably connects the first vent section with the bracket, and a second connecting arm pivotably connects the second vent section with the bracket. A coolant supply line supplies the coolant to the nozzle for ejection through the vents. A coolant regulator regulates the coolant supplied to the coolant supply line, and a coolant reservoir stores the coolant flowing out of the coolant collector. The first and second vent sections are pivotably closed together to surround the quartz tube and eject the coolant through the orifices uniformly around the quartz tube mounted on the lathe. The vent sections are hinged and may be readily pivotably opened to enable the quartz tube to be detached from the lathe and removed from the processing line.

The present invention will now be described more specifically with reference to drawings attached only by of example, throughout which same reference numerals are used to represent same functional elements. In addition, detailed descriptions are not made for the conventional parts unnecessary for grasping the inventive concept.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
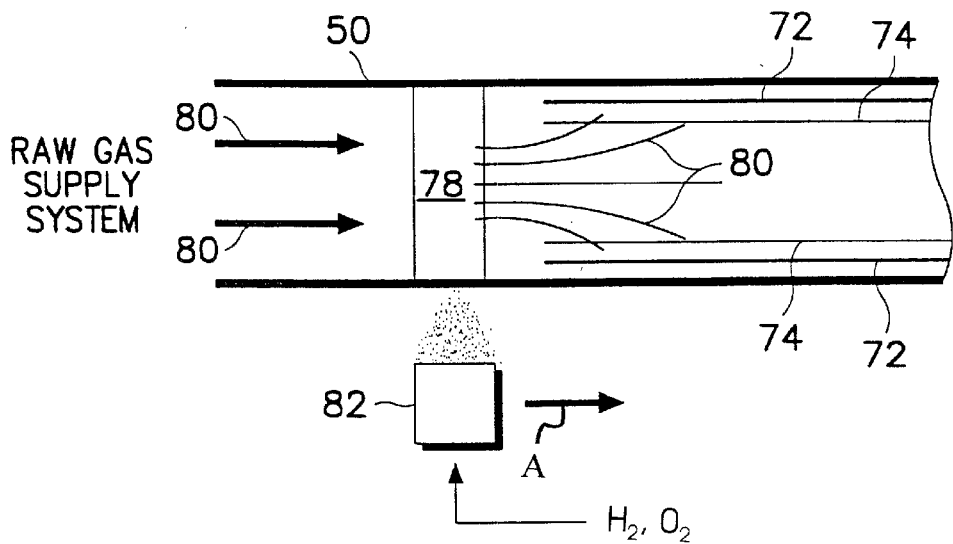
FIG. 1 is a schematic diagram illustrating fabrication of an optical fiber preform by using modified chemical vapor deposition.

Referring now to FIG. 1, an optical fiber preform may be fabricated for a light amplifier by using modified chemical vapor deposition. A raw gas 80 composed of $SiCl_4$ or $GeCl_4$ and a proper amount of an added chemical is made to flow through a quartz tube 50 is securely held by a chuck (not shown) while quartz tube 50 is rotated and heated by a burner 82 to produce a hot zone 78 within quartz tube 50. The raw gas 80 undergoes a chemical reaction in hot zone 78, producing particles. The reaction formula is:

$SiCl_4 + O_2 \rightarrow SiO_2 + 2Cl2$; and
$GeCl_4 + O_2 \rightarrow GeO_2 + 2Cl2$.

The flowing particles are deposited on the inside of quartz tube 50 with a lower temperature in the flowing direction occurring under thermophoresis. As is explained by J. L Wilson, et al., in U.S. Pat. No. 4,632,574 for an Apparatus for Fluidic Support, thermophoresis is an effect which introduces force that directs small, gas borne particles from a relatively hotter region to a relatively cooler region. Typically, the relatively cooler region is provided by a substrate upon which those small, gas borne particles deposit. Enhancement of the thermophoresis effect, which results in movement of the particles from hotter to cooler regions, will yield increased deposition rates. Accordingly, burner 82 is moved at a properly given speed in the direction of the flow of gas 80 indicated by arrow A, so that the chemical reaction to produce the particles is continuously carried out following the path of burner 80, and thus the deposition of the particles occurs along the inside of the quartz tube 50 along that path. Meanwhile, the deposited particles are sintered by the heat of the moving burner 82 to form a glass phase.

Thus, a clad layer 72 is firstly formed on the inside of quartz tube 50 to prevent penetration of foreign matter. Then, core layer 74 that may be used to transmit light waves is formed by flowing raw gas 80 of different composition through quartz tube 50. This quartz tube 50 is heated to a temperature of over 2000° C., collapsed and closed to form a final optical fiber preform.

In order to obtain an optical fiber preform for a light amplifier by using modified chemical vapor deposition, a process such as a liquid penetration technique is used with a gaseous state addition or with sol-gel. The liquid penetration technique is used with a porous layer formed over the core layer. A liquid of a given composition is made to penetrate the porous layer in order to modify the property of the optical fiber preform obtained. In this case, the uniformity, density, particle size, thickness, adhesiveness and other characteristics of the porous layer greatly affect the properties of the resulting optical fiber.

Figure 2:
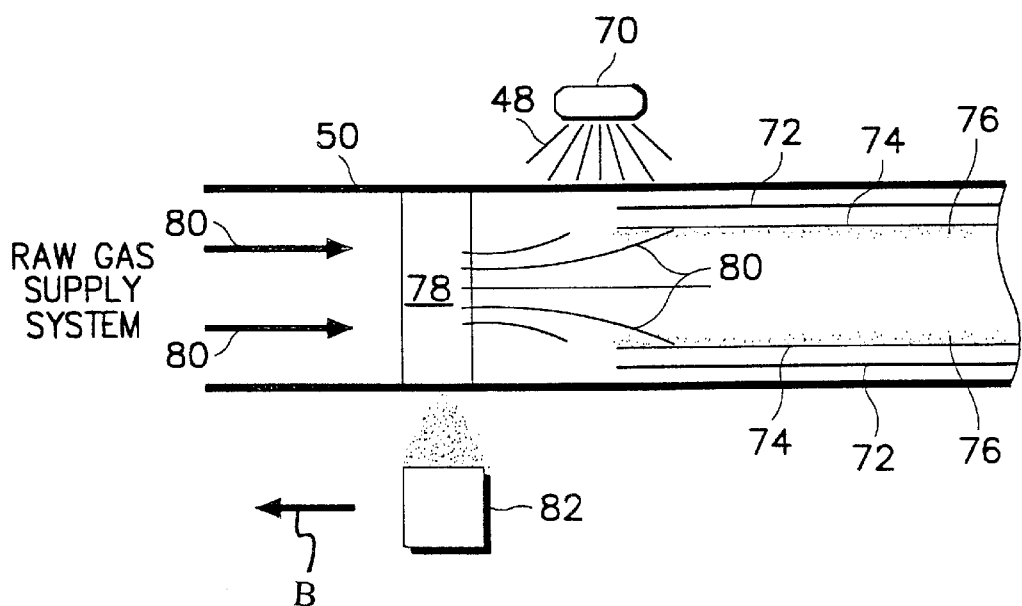
FIG. 2 is a schematic diagram illustrating the step of forming a porous layer in order to fabricate an optical fiber preform for a light amplifier by using a cooling apparatus.

Referring now to FIG. 2, a cooling apparatus 70 is provided behind burner 80 in order to form porous layer. Namely, after forming clad layer 72 and core layer 74 as shown in FIG. 1, burner 82 is continuously moved in the direction indicated by arrow B opposite to the direction of flow of raw gas 80 while cooling apparatus 70 is activated to eject a coolant 48 towards the upper exterior surface of quartz tube 50, whereby porous layer 76 is gradually formed over core layer 74 as shown in FIG. 2. I have found that this cooling process results in non-uniform cooling of the inside of quartz tube 50 because of the coolant being ejected in a single direction towards quartz tube 50, and thus a non-uniform porous layer 76, so that the finally obtained optical fiber has a distributed non-uniform refractive index, a characteristic that I have found to increase reflective loss.

Figure 3:
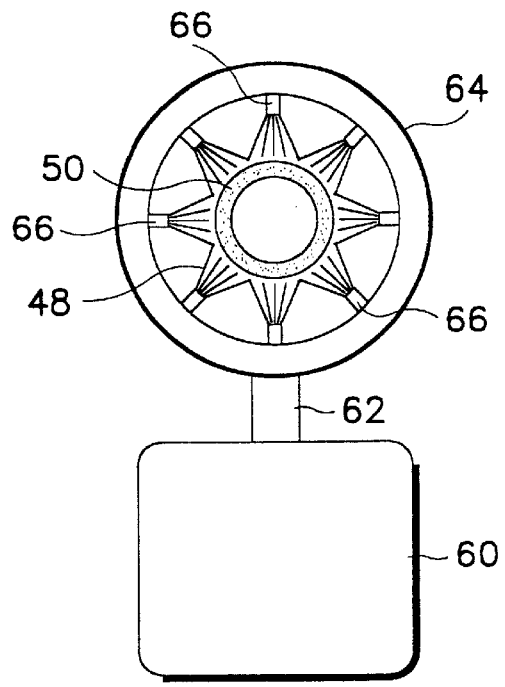
FIG. 3 is a schematic diagram for illustrating the step of forming a porous layer in order to fabricate an optical fiber preform for a light amplifier by using another cooling apparatus.

Another conventional cooling apparatus for manufacturing a porous layer has, as is shown in FIG. 3, coolant supply tank 60 for supplying a coolant 48, nozzle support annular tube 64, connecting tube 62 supplying coolant 48 from coolant supply tank 60 to nozzle support annular tube 64, and a plurality of nozzles 66 radially mounted along and physically supported by the inner perimeter of nozzle support annular tube 64 to eject coolant 48 towards quartz tube 50. Nozzles 66 are projected towards the center of nozzle support annular tube 64. In operation, coolant 48 is supplied from coolant supply tank 60 through nozzles 66 towards the outside of quartz tube 50, thereby forming porous layer 76 over core layer 74 formed on the inside of quartz tube 50.

I have noticed however, that this process also suffers a drawback that it is very difficult to mount the nozzles radially within the inner perimeter of the nozzle support annular tube 64, so that the number of the steps required to assemble the structure shown in FIG. 3 is increased with a concomitant reduction in productivity. In addition, it is impossible to attach or detach a quartz tube to or from a lathe during processing because the nozzle support annular tube is made of a single continuous ring.

Figure 4:
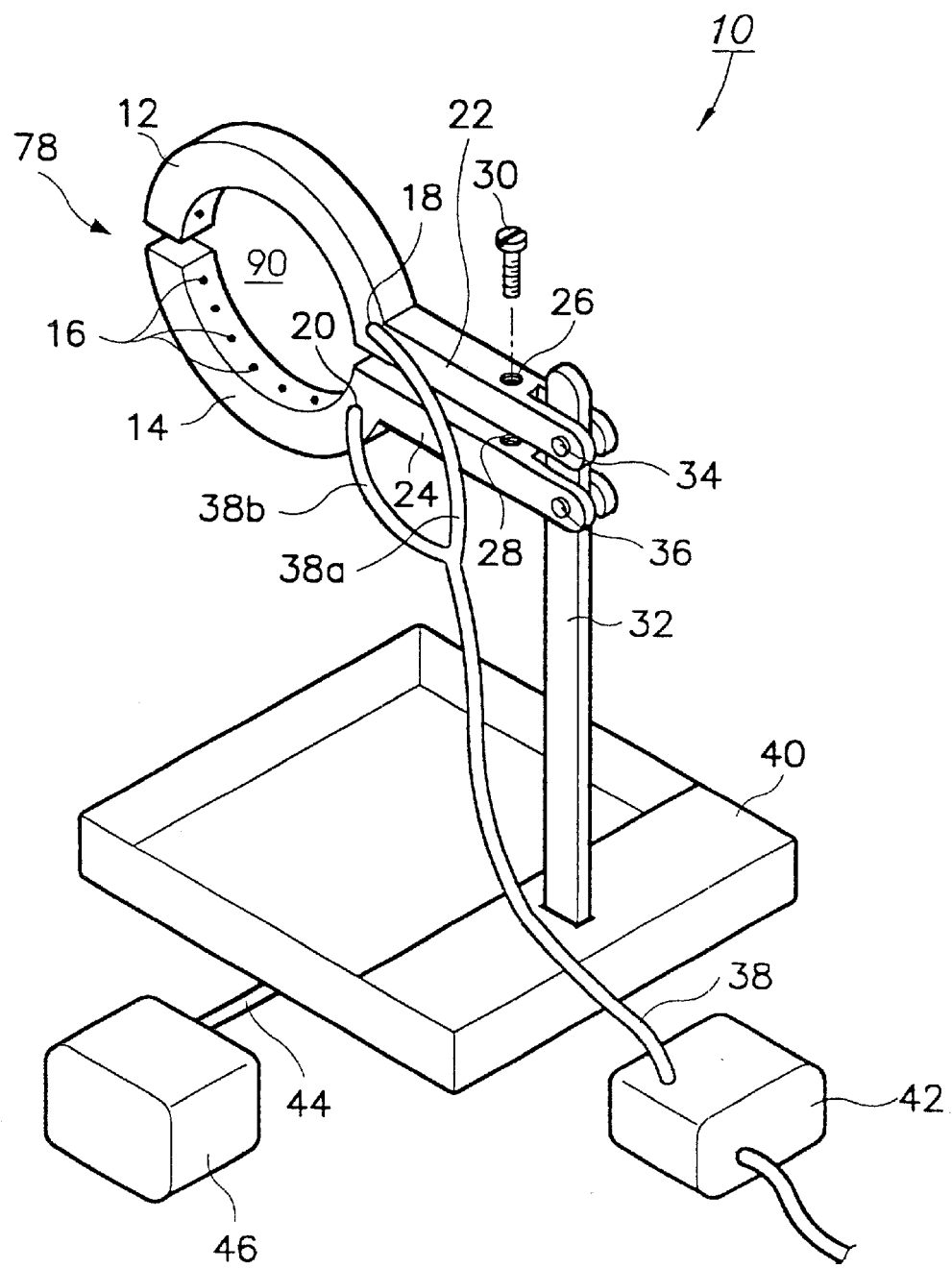
FIG. 4 is a perspective view for illustrating the structure of a cooling apparatus for forming a porous layer in accordance with the principles of the present invention.

Referring now to FIG. 4, a cooling apparatus 10 may be constructed in accordance with the principles of the present invention with nozzle ring 78 forming a plenum with a first hollow vent section 12 and a second hollow vent section 14, supplied with a coolant 48 such as water or nitrogen gas through coolant supply line 38. First and second vent sections 12 and 14 are designed to be easily separated in order to detach quartz tube 50 from a lathe mounting supporting quartz tube 50. A plurality of vents 16 are formed as orifices communicating with the hollow interiors of sections 12, 14, with a constant interval between neighboring vents 16. Vents 16 are radially symmetrically positioned in arcuate separation along the inner circumferential surface of vent sections 12 and 14 for radially ejecting the coolant onto the exterior circumferential surface of the passing quartz tube 50. Vents 16 are arranged in at least one circular line along the inner perimeter of the plenum formed by nozzle ring 78 with two semicircular first and second hollow vent sections 12, 14 in order to uniformly cool quartz tube 50 so as to achieve a uniform porous layer 76 for an optical fiber preform for a light amplifier.

The first vent section 12 has at one side a first connection hole 18 connected with a first coolant supply tube 38a for guiding the coolant to first vent section 12. Likewise, second vent section 14 has at one side a second connection hole 20 connected with a second coolant supply tube 38b for guiding the coolant to second vent section 14. First and second coolant tubes 38a and 38b are branched from coolant supply line 38. Of course, the first and second coolant supply tubes may be separately arranged.

A coolant collector 40 is arranged below the segmented and hinged, two part plenum formed by nozzle ring 78 to collect the coolant ejected out of vents 16. Coolant collector 40 is connected with a coolant reservoir 46 through a discharge tube 44. A bracket 32 is provided to support nozzle ring 78 and connect it with coolant collector 40. Bracket 32 is arranged to move nozzle ring 78 along quartz tube 50 as quartz tube 50 is cooled. If coolant 48 is a gas, coolant collector 40, coolant reservoir 46 and discharge tube 44 are separated from cooling apparatus 10.

Figure 5:
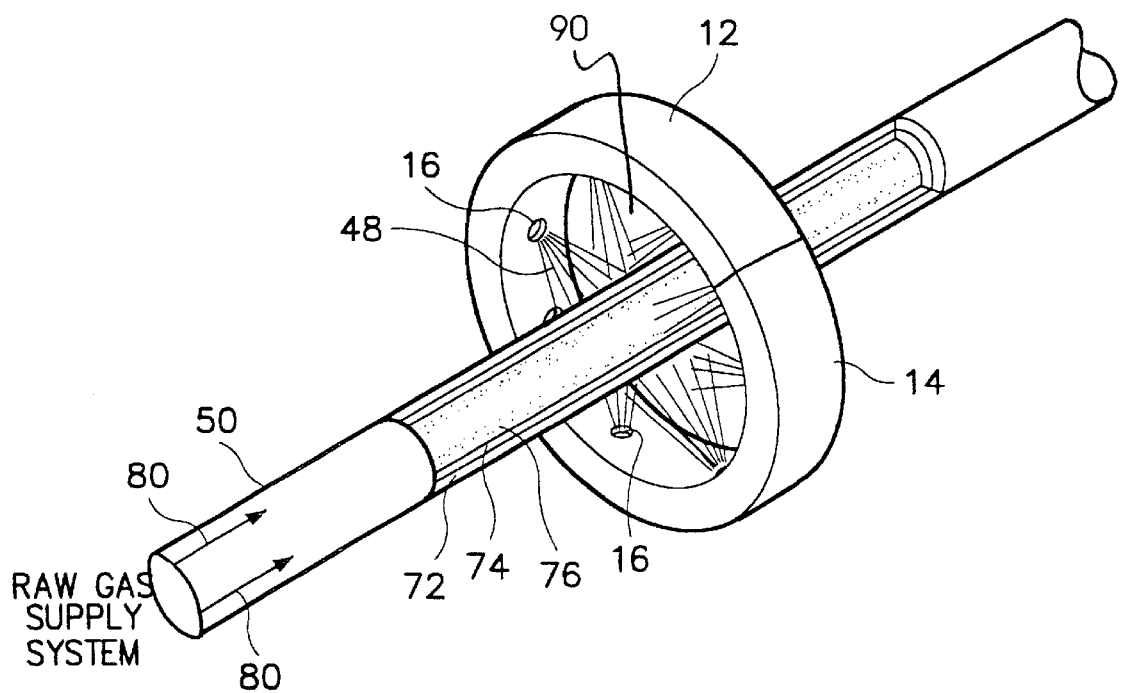
FIG. 5 is a perspective view for illustrating the step of forming a porous layer in order to make an optical fiber preform for a light amplifier by using a cooling apparatus in accordance with the principles of the present invention.

A first connecting arm 22 is provided to pivotably connect first vent section 12 with bracket 32 via first hinge pin 34. Likewise, second connecting arm 24 is provided to pivotably connect second vent section 14 with bracket 32 via a second hinge pin 36. As shown in FIG. 5, the distal ends of first and second semicircular vent sections 12, 14 abut along junction 92 to form a complete circle surrounding quartz tube 50. First and second connecting arms 22 and 24 may be fastened together by a threaded fastener such as screw 30 so as to prevent first and second vent sections 12 and 14 from being moved when closed together around quartz tube 50. Screw 30 is inserted through first and a second screw holes 26 and 28 respectively formed in first and second connecting arms 22, 24. Coolant regulator 42 is connected to coolant supply line 38 to regulate the supply of coolant 48 to vent ring 78.

The inventive cooling apparatus illustrated in FIGS. 4 and 5 and described in the foregoing paragraphs may be applied for all the various processes in order to cool the quartz tubes for fabricating optical fiber preforms by modified chemical vapor deposition, and to form the porous layers in the quartz tubes for fabricating optical fiber preforms for light amplifiers and erbium added optical fiber preforms.

Turning now to FIG. 5, the cooling process followed in the practice of the present invention contemplates formation of porous layer in a quartz tube for fabricating an optical fiber preform for a light amplifier, by sequentially forming a clad layer 72 for preventing penetration of foreign matter and a core layer 74 for transmitting light waves on the inside of a quartz tube 50 securely attached to a lathe. Then, quartz tube 50 is placed between first and second vent sections 12 and 14 by pivoting first and second connecting arms 22 and 24 respectively on first and second hinges 34 and 36 towards each other to form an unobstructed central aperture 90 that accommodates passage of quartz tube 50. First and second vent sections 12 and 14 are firmly fastened by, for example, screw 30 to complete circular nozzle ring 78. Of course, the quartz tube 50 may be easily detached as desired by unfastening the screw 30 to separate first and second vent sections 12 and 14.

Thereafter, coolant 48 is regulated by coolant regulator 42 supplied to the coolant supply line 38. The first and second vent sections 12 and 14 are respectively supplied with coolant 48 through first and second coolant supply tubes 38a and 38b. Coolant 48 is then ejected through vents 16 towards the outside circumferential surface of quartz tube 50 so as to uniformly cool quartz tube 50, So that a porous layer 76 is formed over core layer 74. The ejected coolant 48 is collected by coolant collector 40, and drawn through discharge tube 44 into coolant reservoir 46.

As described above, the present invention provides an apparatus and process for uniformly forming a length of a porous layer in a quartz tube. Instead of attaching a plurality of specially prepared nozzles to a nozzle ring, the inventive cooling apparatus is able to use a plurality of vents directly formed in an arcuately spaced-apart relation around the interior circumferential surface of the nozzle ring, so that the assembly process is simplified with considerable reduction of cost. In addition, the nozzle ring may be divided into the first and second vent sections so as to allow easy attachment and detachment of a quartz tube to and from a lathe. Moreover, the first and second vent sections are separately structured making it possible to supply the coolant to a part of the quartz tube as desired. Furthermore, the bracket may move the nozzle part along the quartz tube so as to adjust the position of the cooling apparatus.

What is claimed is:

1. An apparatus for cooling a quartz tube used in fabrication of an optical fiber preform by modified chemical vapor deposition, comprising:

a vent ring comprised of separated first and second arched vent sections;

a coolant regulator connected to a coolant supply line to regulate a supply of coolant to said first and second arched vent sections, said first and second arched vent sections each including a plurality of vents for discharging said coolant onto said quartz tube;

a coolant collector for collecting coolant discharged from said vent ring;

a reservoir for containing the coolant collected by said coolant collector;

a support bracket extending vertically upwards from said coolant collector;

a first connecting arm pivotally connected to said support bracket at one end and connected at a distal end to said first arched vent section;

a second connecting arm pivotally connected to said support bracket at one end and connected at a distal end to said second arched vent section;

a first screw hole formed in said first connecting arm;

a second screw hole formed in said second connecting arm; and a screw for being threaded through said first and second screw holes for firmly fastening said first and second connecting arms to complete a circular nozzle ring.

2. The apparatus as set forth in claim 1, wherein said vents are formed in at least two lines so as to uniformly cool said quartz tube to produce a uniform porous layer.

3. The apparatus as set forth in claim 1, wherein said vent ring is movable along the length of said quartz tube.

4. The apparatus as set forth in claim 1, wherein said vents are symmetrically spaced apart from each other.

5. The apparatus as set forth in claim 1, wherein said vents are formed at symmetric radial positions along said first and second arched vent sections.

6. The apparatus as set forth in claim 1, wherein said coolant is comprised of water.

7. The apparatus as set forth in claim 1, further comprising a discharge tube for providing said coolant collected by said coolant collector to said reservoir.

8. An apparatus for cooling a quartz tube used in fabrication of an optical fiber preform by modified chemical vapor deposition, comprising:

a nozzle ring comprised of separated first and second arched nozzle sections;

a coolant regulator connected to a coolant supply line to regulate a supply of coolant to said first and second arched nozzle sections, said first and second arched nozzle sections each including a plurality of nozzles for discharging said coolant onto said quartz tube;

a support bracket adapted to move said nozzle ring along said quartz tube;

a first connecting arm pivotally connected to said support bracket at one end and connected at a distal end to said first arched nozzle section;

a second connecting arm pivotally connected to said support bracket at one end and connected at a distal end to said second arched nozzle section;

a first screw hole formed in said first connecting arm;

a second screw hole formed in said second connecting arm; and a screw when threaded through said first and second screw holes firmly fastening said first connecting arm and said second connecting arm to complete a circular nozzle ring.

9. The apparatus as set forth in claim 8, wherein said coolant is comprised of nitrogen gas.

10. The apparatus as set forth in claim 8, wherein said nozzles are formed at symmetric radial positions along said first and second arched nozzle sections.

11. An apparatus for cooling quartz tubes, comprising:

a plurality of blind conduits each having an inlet leading into an interior passage bounded by an inner periphery perforated by a plurality of incrementally spaced apart nozzles oriented to provide a uniformly distributed discharge directed radially toward a center of a continuous round configuration defined by said inner periphery of each of said conduits being in juxtaposition when in a closed state surrounding said center while creating a through bore coextensive with said center to accommodate axial passage of a quartz tube;

a bracket supporting said plurality of conduits in said closed state with said nozzles arrayed uniformly along a closed line extending around each said inner periphery in said continuous geometric configuration; and a hinge pivotally coupling a first one of said conduits to break said closed line and provide radial access to said through bore by moving from said closed state to an opened state providing a gap between said first one of said conduits and a second one of said conduits accommodating radial removal of the quartz tube from said through bore.

12. The apparatus of claim 11, further comprising:

a container; and a conduit coupling each said inlet to said container.

13. The apparatus of claim 11, further comprising:

both said first one of said conduits and said second one of said conduits having a distal end terminating a different corresponding said interior passage; and said distal end of said first one of said conduits abutting said distal end of said second one of said conduits while said plurality of conduits are in said closed state.

14. The apparatus of claim 11, further comprising each of said conduits positioning a corresponding said inner periphery as an accurate segment of said configuration extending coextensively along said closed line while said plurality of brackets are in said closed state.

15. The apparatus of claim 11, with said round configuration comprising a circle with said inner periphery of each of said conduits defining a different arc of said circle.

16. The apparatus of claim 11, further comprising:

both said first one of said conduits and said second one of said conduits having a distal end terminating a different corresponding said interior passage; and said distal end of said first one of said conduits abutting said distal end of said second one of said conduits while said plurality of conduits are in said closed state and being spaced apart while said plurality of conduits are in said opened state.

17. The apparatus of claim 13, with said round configuration comprising a circle with said inner periphery of each of said conduits defining an arc of said circle.

18. The apparatus of claim 16, with said round configuration comprising a circle with said inner periphery of each of said conduits defining a different arc of said circle.

19. An apparatus for cooling a quartz tube, comprising:

a vent ring comprised of separated first and second arched vent sections defining an unobstructed central aperture, said vent ring being closed when said first and second arched vent sections are joined, for accommodating axial passage of a quartz tube through the ring during modified chemical vapor deposition fabrication of an optical fiber, and said vent ring being open when said arched vent sections are spaced apart, for allowing detaching of the quartz tube;

a coolant regulator connected to a coolant supply line to regulate a supply of coolant to said first and second arched vent sections, said first and second arched vent sections each including a plurality of vents for discharging said coolant onto the quartz tube;

a coolant collector for collecting coolant discharged from said vent ring;

a reservoir for containing the coolant collected by said coolant collector;

a support bracket extending vertically upwards from said coolant collector;

a first connecting arm pivotally connected to said support bracket at one end and connected at a distal end to said first arched vent section; and a second connecting arm connected to said support bracket at one end and connected at a distal end to said second arched vent section.

20. An apparatus for cooling a quartz tube, comprising:

a nozzle ring comprised of separated first and second arched nozzle sections defining an unobstructed central aperture, said nozzle ring being closed when said first and second arched nozzle sections are joined, for accommodating axial passage of a quartz tube through the ring during modified chemical vapor deposition fabrication of an optical fiber, and said nozzle ring being open when said arched nozzle sections are spaced apart, for allowing detaching of the quartz tube;

a coolant regulator connected to a coolant supply line to regulate a supply of coolant to said first and second arched nozzle sections, said first and second arched nozzle sections each including a plurality of nozzles for discharging said coolant onto the quartz tube;

a support bracket adapted to move said nozzle ring along the quartz tube;

a first connecting arm connected to said support bracket at one end and connected at a distal end to said first arched nozzle section;

a second connecting arm pivotally connected to said support bracket at one end and connected at a distal end to said second arched nozzle section; and a fastener firmly joining said distal ends of said first connecting arm and said second connecting arm to complete a circular said nozzle ring.

* * * * *